United States Patent
Wang et al.

(10) Patent No.: US 6,415,154 B1
(45) Date of Patent: Jul. 2, 2002

(54) METHOD AND APPARATUS FOR COMMUNICATING AUXILLIARY INFORMATION AND LOCATION INFORMATION BETWEEN A CELLULAR TELEPHONE NETWORK AND A GLOBAL POSITIONING SYSTEM RECEIVER FOR REDUCING CODE SHIFT SEARCH TIME OF THE RECEIVER

(75) Inventors: Yi-Pin Eric Wang; Sandeep Chennakeshu, both of Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/167,077

(22) Filed: Oct. 6, 1998

(51) Int. Cl.⁷ ................................................ H04Q 7/20
(52) U.S. Cl. ............ 455/456; 342/357.03; 342/357.06; 342/450
(58) Field of Search ................................ 455/456, 457; 342/357.15, 357.01, 357.02, 357.03, 357.05, 357.06, 357.09, 357.1, 357.12, 457

(56) References Cited

U.S. PATENT DOCUMENTS

| | | | |
|---|---|---|---|
| 5,490,073 A | 2/1996 | Kyrtsos | 364/449 |
| 5,638,077 A | 6/1997 | Martin | 342/357 |
| 5,809,424 A | 9/1998 | Eizenhoefer | 455/456 |
| 5,812,932 A * | 9/1998 | Wiedeman et al. | 455/13.1 |
| 5,913,170 A | 6/1999 | Wortham | 455/457 |
| 6,070,078 A * | 5/2000 | Camp et al. | 455/456 |
| 6,121,923 A * | 9/2000 | King | 342/357.12 |
| 6,150,980 A * | 11/2000 | Krasner | 342/357.1 |

FOREIGN PATENT DOCUMENTS

| | | |
|---|---|---|
| EP | 0 774 843 A2 | 5/1997 |
| GB | 2264837 | 8/1993 |
| GB | 2308033 | 11/1997 |
| WO | WO 96/07110 | 3/1996 |
| WO | WO 97/33382 | 9/1997 |
| WO | WO 98/02974 | 1/1998 |
| WO | WO 98/37710 | 8/1998 |
| WO | 99/23382 | 6/2000 |

OTHER PUBLICATIONS

M. Mouly, "The GSM System for Mobile Communications", 1993, Lassay–Les–Chateaux, Europe Media, France, XP002079145, Section 6.3.1. "Initial Procedures: Access and Initial Assignment", pp. 367–372.
M. Mouly, "The GSM System for Mobile Communications", 1993, Lassay–Les–Chateaux, Europe Media, France, XP002131604 Section 4.1.2.2. Signaling Outside a Call, p. 191.
M. Mouly, "The GSM System for Mobile Communications", 1993, Lassay–Les–Chateaux, Europe Media, France, XP002138447, Short Message Services, pp. 56–57.
M. Mouly, "The GSM System for Mobile Communications", 1993, Lassay–Les–Chateaux, Europe Media, France, XP002035632, Section 6.1.5.2, "Timing Advance", pp. 346–349.

* cited by examiner

*Primary Examiner*—Lee Nguyen
(74) *Attorney, Agent, or Firm*—Myers Bigel Sibley & Sajovec

(57) ABSTRACT

A method and apparatus for communicating auxiliary information between a cellular telephone network and a GPS receiver positioned within a mobile station and identifying the location of the mobile station. A dedicated channel between the mobile station and the network is assigned by the network and uplink timing between the mobile station and the network is adjusted. The network requests auxiliary information and also requests the GPS receiver to perform a GPS code shift search at a common reference time. Upon receiving the auxiliary information, the network transmits the auxiliary information to the GPS receiver which then performs the GPS code shift search. The GPS receiver incorporates a bank of correlators and accumulators to perform multiple parallel searches for various Doppler frequency shifts resulting from a moving GPS receiver. The mobile station subsequently transmits the location information to the cellular telephone network.

17 Claims, 4 Drawing Sheets

METHOD AND APPARATUS FOR COMMUNICATING AUXILLIARY INFORMATION AND LOCATION INFORMATION BETWEEN A CELLULAR TELEPHONE NETWORK AND A GLOBAL POSITIONING SYSTEM RECEIVER FOR REDUCING CODE SHIFT SEARCH TIME OF THE RECEIVER

CROSS-REFERENCE TO RELATED APPLICATIONS

This application is related to commonly assigned U.S. patent application Ser. No. 08/950,690, entitled "Reduced Global Positioning System Receiver Code Shift Search Space for A Cellular Telephone System," filed Oct. 15, 1997 (Docket No. 27951-00170; inventors William Camp, Kambiz Zangi and Rajaram Ramesh), the disclosure of which is hereby incorporated by reference.

BACKGROUND OF THE INVENTION

1. Technical Field of the Invention

The present invention pertains in general to a method and apparatus for reducing code shift search time in a Global Positioning system receiver, and more particularly, to reducing code shift search time in a Global Positioning System receiver positioned within a cellular mobile station operating within a cellular telephone network.

2. Description of Related Art

It is desirable, and likely to be mandatory in the future, that cellular telephone networks be equipped to determine the geographical location of cellular telephones operating within the cellular telephone network. To meet this requirement it has been proposed that cellular telephones be equipped with Global Positioning System (GPS) receivers for determining the location of the cellular telephone. GPS receivers, however, are expensive, increase cellular telephone size, and consume the limited amounts of battery power available to the cellular telephone.

GPS receivers require auxiliary information also known as side information which refers to information such as the number of satellites in view, the Gold code number used by these satellites, the Doppler frequency for the signals transmitted by these satellites, the time delays from these satellites to users located at the center of the cell, and the size of the search window for the Gold code used by each satellite in view.

A typical GPS receiver includes at least a signal acquisition circuit and a demodulation and decoding circuit. Most of the complexity resides in the acquisition circuit. The acquisition circuit tries to search through all Gold codes used by the GPS system with frequency and timing uncertainty. The goal is to identify the code, symbol boundary and Doppler frequency used by the GPS satellites in view. This is a very complicated and power consuming process because it involves three-dimensional search (code-time-frequency). Once the receiver acquires the GPS signals, reading ephemeris data is very straightforward. When auxiliary information is provided to a GPS receiver, the complexity of such a three-dimensional searching process can be significantly reduced.

To calculate the auxiliary information for the GPS receiver, however, the approximate location of the GPS receiver must be known. Moreover, the closer the actual location of the GPS receiver to the location used in calculating the auxiliary information, the smaller the resulting location search to be performed by the GPS receiver. A smaller search greatly simplifies the time measurement process. The search can be reduced to finding the relative code shift position locations to much less than a one millisecond code cycle. Furthermore, once a code shift position is located for a first GPS satellite, the GPS receiver recalibrates its timing and corrects errors in the predicted code shift positions for the remaining GPS satellites. For a more detailed explanation regarding the use of auxiliary information by GPS receivers, reference is made to the previously identified cross referenced application.

Code shift search time also varies with the speed at which the GPS satellite is moving. As the GPS satellite moves, a Doppler frequency shift occurs whose magnitude is dependent on the speed at which the GPS satellite is moving.

It would be advantageous, therefore, to devise a method and apparatus to communicate the auxiliary information from a base station of a cellular telephone network to a GPS receiver located within a mobile station and further to provide the GPS receiver with satellite elevation information such that the GPS receiver can search the code shift position for a satellite having the highest elevation angle thereby reducing the time required for a GPS receiver to determine its location. It would still further be advantageous if the code shift search accommodated for a moving GPS receiver.

SUMMARY OF THE INVENTION

The present invention comprises a method and apparatus for communicating auxiliary information between a cellular telephone network and a GPS receiver positioned within a mobile station. A dedicated channel between the mobile station and the network is assigned by the network and uplink timing between the mobile station and the network is adjusted. The network requests auxiliary information, which among other information, includes satellite elevation angle information and upon receiving the auxiliary information, the network transmits the auxiliary information to the GPS receiver to perform a GPS code shift search at a common reference time and the GPS receiver then performs the GPS code shift search using the auxiliary information. The GPS receiver incorporates a bank of multiple correlators and accumulators which perform two dimensional searches of different time shifts and accumulators. The mobile station subsequently transmits time of arrival information to the cellular telephone network.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF EMBODIMENTS

Figure 1:
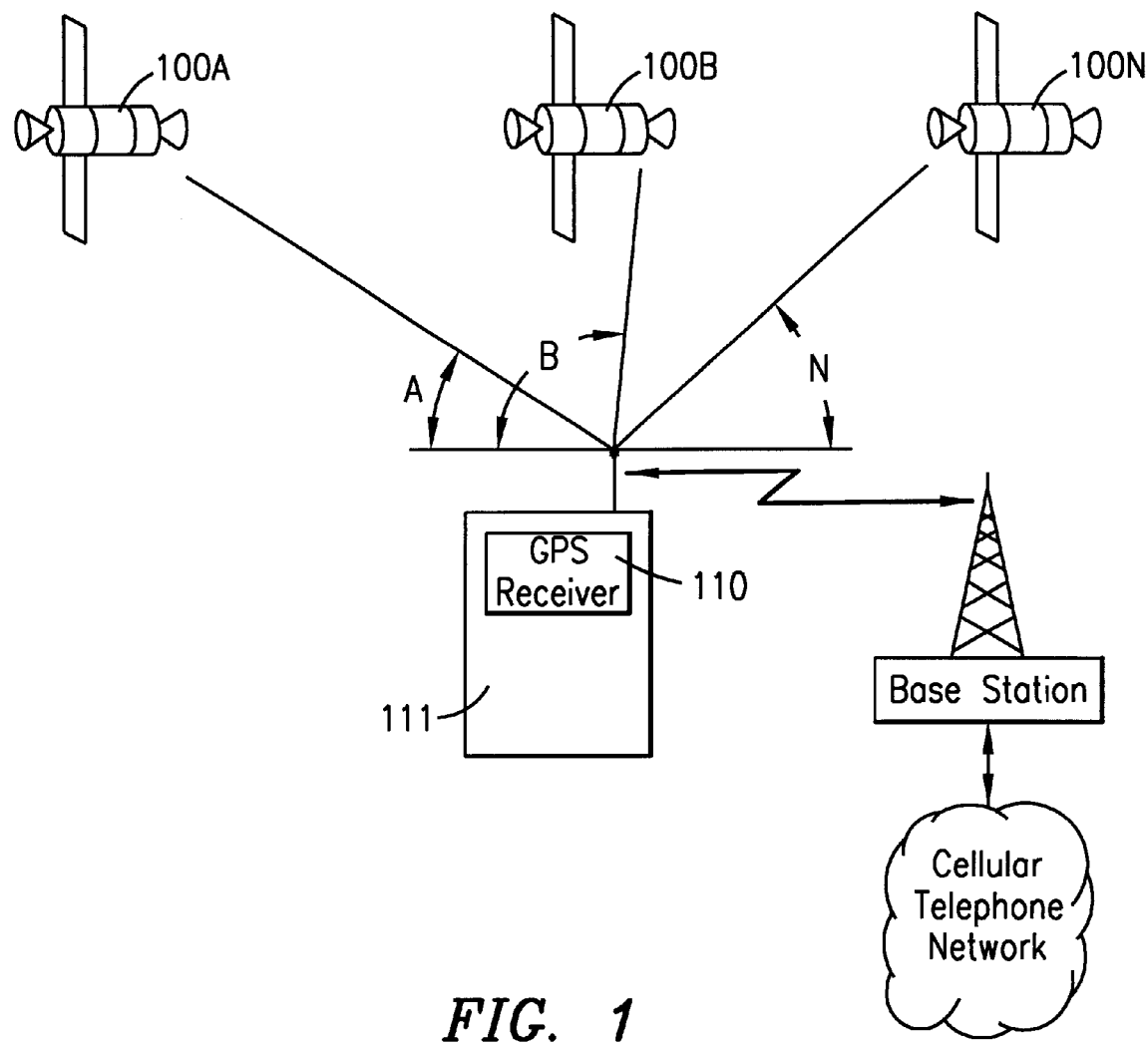
FIG. 1 is a pictorial diagram of elevation angles for a plurality of Global Positioning System satellites with respect to a Global Positioning system receiver.

Referring now to FIG. 1, there is illustrated a pictorial diagram of elevation angles for a plurality of Global Positioning System satellites with respect to a Global Positioning System receiver. A plurality of Global Positioning System (GPS) satellites 100A–N, in view of a GPS receiver 110 within a mobile station 111, have elevation angles A–N. Typically there are between five to eight GPS satellites 100A–N in view of the GPS receiver 110 at any given time.

Figure 2:
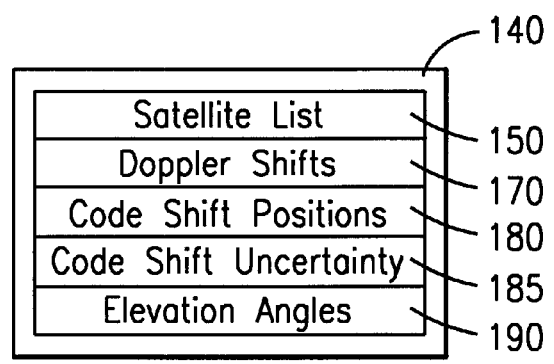
FIG. 2 is a block diagram of auxiliary information transmitted from a base station to a mobile station.

Referring additionally now to FIG. 2, there is illustrated a block diagram of auxiliary information provided to a Global Positioning System receiver. Auxiliary information 140 contains a list 150 of the plurality of GPS satellites 100A–N in view of the GPS receiver, Doppler corrections 170 for each of the plurality of GPS satellites 100 A–N, nominal code shift positions 180 which refer to code shift positions expected for users at a reference position within a cell (e.g. the center of a cell), degree of code shift search uncertainty 185 for each of the plurality of GPS satellites 100A–N based upon a universal coordinated time and a list of elevation angles 190 for each of the listed GPS satellites 150. Alternatively, the list of elevation angles 190 is eliminated and the satellites 100A–N are ordered within the list 150 according to the elevation angle A–N such that the GPS receiver 110 can identify the satellite having the greatest elevation angle A–N.

Figure 3:
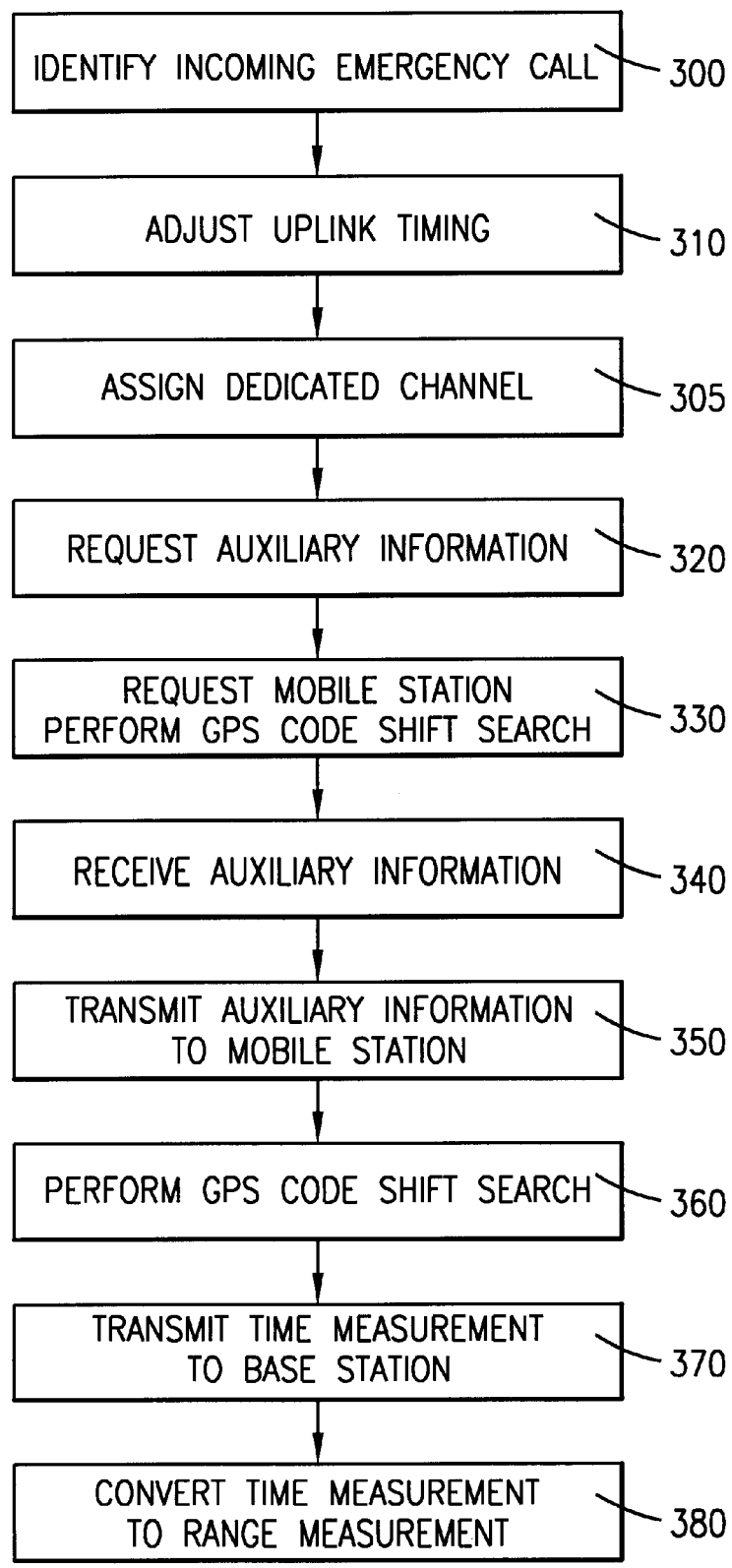
FIG. 3 is a flow diagram of a method to perform a call setup consistent with the present invention.

Referring now to FIG. 3, there is illustrated a flow diagram of a method to perform a call setup consistent with the present invention. Upon identifying a request from a mobile station as an emergency call (step 300), a cellular telephone network adjusts the uplink timing with a time advance command such that subsequent bursts sent by the mobile station are synchronous at the receive antenna interface of a serving base station (step 310) and assigns a dedicated channel between the mobile station and the cellular telephone network (step 305). For example, in a Global System for Mobile communication (GSM) system, the mobile station requests a channel on the Random Access CHannel (RACH) and the cellular telephone network sends an Access Grant CHannel (AGCH) burst to assign the dedicated channel. To determine the time base at the mobile station, the cellular telephone network estimates the round trip propagation delay between the mobile station and the serving base station by measuring the timing of the RACH burst sent by the mobile station. The serving base station requests auxiliary information (step 320) and sends a request to a GPS receiver within the mobile station to perform a GPS code shift search at a common reference time (step 330). The common reference time is specified as an uplink absolute frame number (AFN). The serving base station receives the auxiliary information (step 340) and transmits the auxiliary information to the GPS receiver within the mobile station (step 350). The auxiliary information is transmitted to the mobile station via a Stand alone Dedicated Control CHannel (SDCCH) in a GSM cellular telephone network, via a Digital Control CHannel (DCCH) in an Digital Advanced Mobile Phone Service (DAMPS) system or via a Short Message Service (SMS) message.

The GPS receiver within the mobile station performs the GPS code shift search at the specified uplink absolute frame number (step 360) using the auxiliary information. The GPS receiver uses the satellite elevation information to search the satellite with the highest elevation angle first. Correlations between the received GPS signal and the Gold code generated by the GPS receiver with various code phases are calculated. It is understood that a GPS signal is a spread spectrum signal using direct sequence modulation in which each symbol is spread by a Gold code. Due to the Doppler effect, the chip duration of the received GPS signal is different from that of the Gold code generated by the GPS receiver. As a result, the GPS receiver may experience chip slips. Since the Doppler frequency of the received GPS signal is provided to the GPS receiver in the auxiliary information, however, the GPS receiver adjusts the chip slips when necessary thus achieving accurate code shift search. The code chip boundary at the uplink absolute frame number is used as a base line reference for a chip boundary used in adjusting chip slips. Once the GPS receiver within the mobile station finishes the code shift search for each GPS satellite listed in the auxiliary information, it transmits the time measurement to the base station (step 370) and the cellular telephone network converts the time measurement into a range measurement (step 380).

Figure 4:
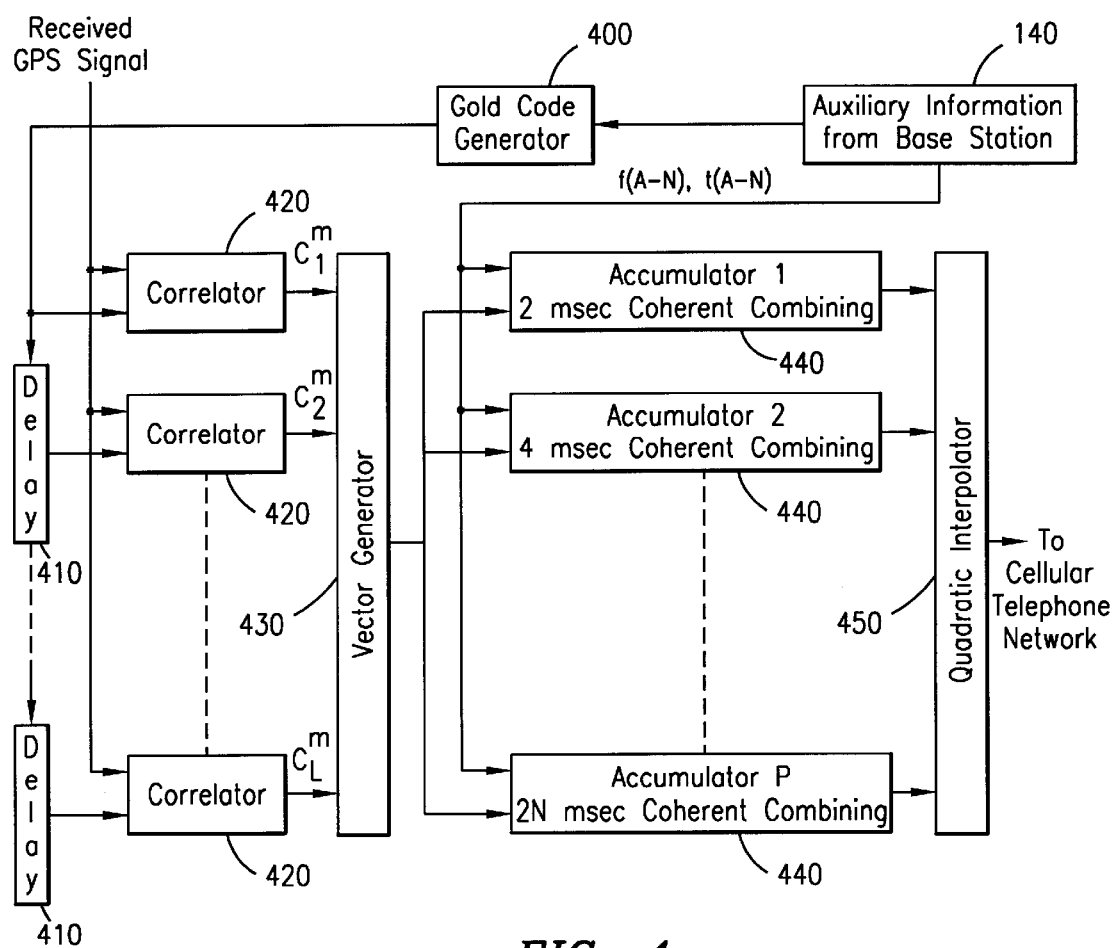
FIG. 4 is a functional block diagram for plurality of correlators and accumulators for reducing the code shift search time of a global positioning receiver.

Referring additionally now to FIG. 4, there is illustrated a functional block diagram for plurality of correlators and accumulators for reducing the code shift search time of a global positioning receiver. To perform a code shift search, the GPS receiver 110 uses the auxiliary information 140 to generate a Doppler frequency f(A–N) and a nominal code delay t(A–N) for each of the GPS satellites 100A–N. A Gold code generator 400 uses the auxiliary information 140 to generate a Gold code for each of the GPS satellites 100A–N. The GPS receiver 110 passes the Gold code into a series of delay lines 410 to produce Gold codes of different delays.

A plurality of correlators 420 calculate a correlation between the received GPS signal and the various Gold codes of different delays. The plurality of correlators 420 produce a plurality of correlation values $C_L^m$ where m denotes that the correlation is performed over the m-th one millisecond interval which is the period of the Gold code and L denotes the number of delays added. To get a reliable code shift search in low signal to noise conditions, however, correlation over a longer period of time much greater than one millisecond may be necessary. Various problems develop when calculating correlations over a long period of time. First, coherency loss results from the fact that the nominal Doppler frequencies f(A–N), which are the frequencies expected by users located at a reference location in a cell (e.g. the center of a cell), obtained from the cellular telephone network may vary from the actual Doppler frequency by up to ten hertz. The difference in frequency causes a carrier phase change up to ten cycles per second. A second problem involves coherence timing which is a function of how fast the GPS receiver 110 is moving. For example, a GPS receiver 110 moving at sixty miles per hour has a coherency time which is one twentieth of the coherency time of a GPS receiver 110 moving at three miles per hour. Lastly, code chip slip due to the difference between the frequency references at the GPS satellites 100A–N and the GPS receiver 110 is more pronounced when correlation is performed over a long period of time.

To address these problems and reduce the code shift search time, the plurality of correlation values $C_L^m$ during the n-th one millisecond interval, are combined into a vector $C^m = (C_1^m, C_2^m, \ldots C_{L_i}^m)$ by vector generator 430 and provided together with the nominal Doppler frequencies f(A–N) and nominal code delays t(A–N) to a plurality of accumulators 440 which combine the one millisecond correlation vectors $$\vec{c_i^m}$$

in different combinations. For example, the fit accumulator performs coherent combining over two milliseconds, thus, the l-th element of the vector after accumulation is given by the expression:

$$A_l^1 = \sum_m \left| \sum_{n=0}^{1} C_l^{2m+n} \right|^2, l = 1, 2, \ldots, L. \quad \text{Expression (1)}$$

where the inner summation is coherent combining and the outer summation is non-coherent combining. Similarly, the last accumulator P performs coherent combining according to the expression:

$$A_l^P = \sum_m \left| \sum_{n=0}^{P-1} C_1^{Pm+n} \right|^2, l = 1, 2, \ldots, L. \quad \text{Expression (2)}$$

By performing coherent combining in a variety of combinations, each accumulator 440 is designed to be optimized to a GPS receiver 110 moving at a different speed. Thus, the first accumulator performs best for a fast moving GPS receiver 110 while accumulator P performs best for a stationary GPS receiver 110.

Finally, the largest accumulation value along with accumulation values from the two neighboring values of the same vector are passed through a quadratic interpolation 450 where a quadratic interpolation algorithm is used to produce a peak value. The peak value corresponds to the location information which is sent back to the cellular telephone network for location determination.

Figure 5:
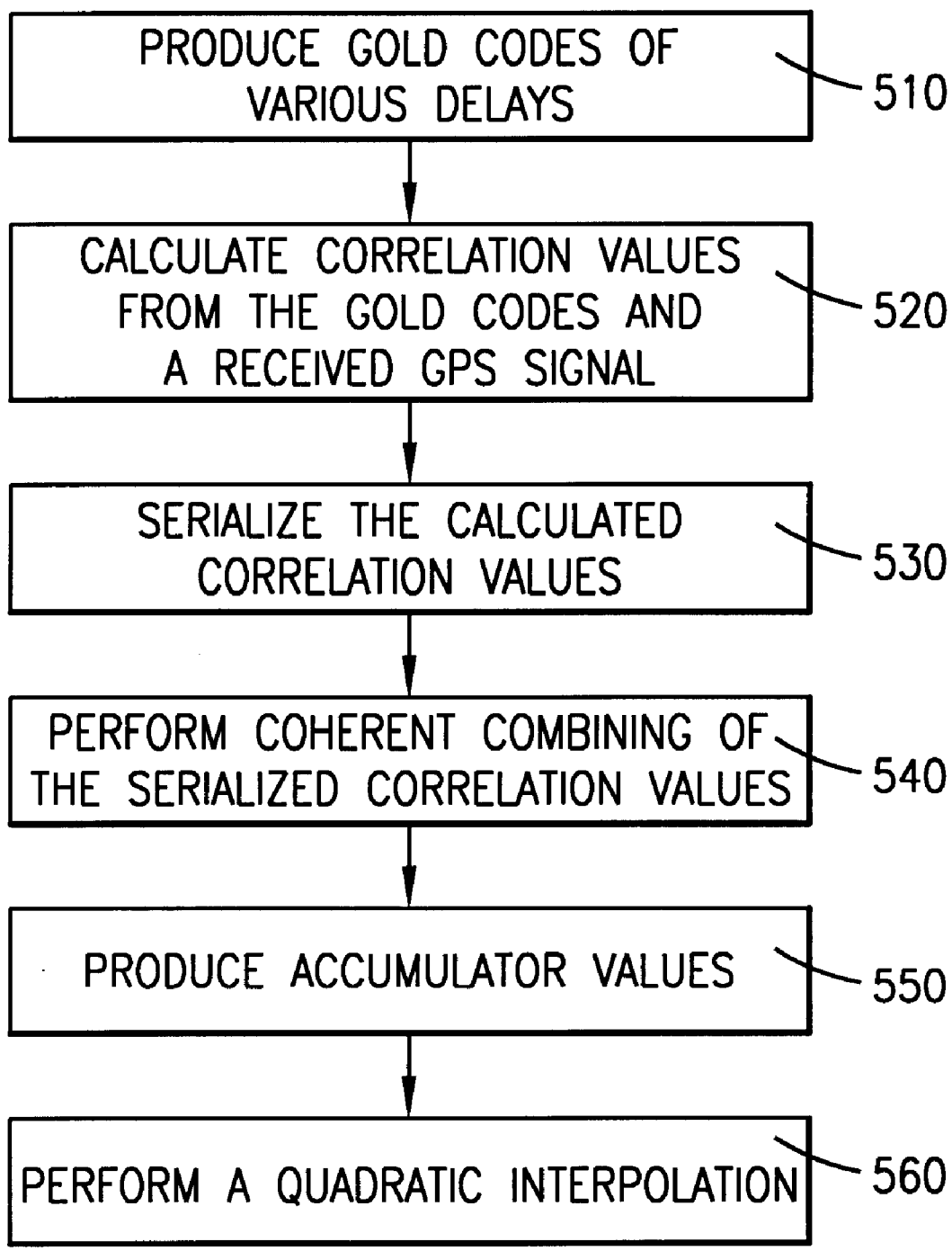
FIG. 5 is a flow diagram of a method for reducing the code shift search time of a global positioning receiver consistent with the block diagram of FIG. 4.

Referring additionally now to FIG. 5, there is illustrated a flow diagram of a method for reducing the code shift search time of a global positioning receiver consistent with the block diagram of FIG. 4. Utilizing the delay lines 410, Gold codes of various delays are produced (step 510). The plurality of correlators 420 calculate correlation values from the Gold codes and a received GPS signal (step 520). The parallel to vector generator 430 serializes the calculated correlation values (step 530) and the plurality of accumulators 440 perform coherent combining of the serialized correlation values (step 540) to produce respective accumulator values (step 550). The quadratic interpolator 450 performs a quadratic interpolation on an output of the accumulator having a strongest accumulator value and the output of two neighboring correlators 420 (step 560).

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for communication auxiliary information and location information between a cellular telephone network and a GPS receiver positioned within a mobile station comprising the steps of:
 assigning a dedicated channel between the mobile station and the cellular telephone network;
 adjusting uplink timing between the mobile station and the cellular telephone network;
 requesting auxiliary information including a list of GPS satellites listed according to their respective elevation angles in descending order;
 requesting the GPS receiver to perform a GPS code shift search at a common reference time;
 transmitting the auxiliary information to the GPS receiver within the mobile station;
 performing the GPS code shift search; and
 transmitting the location information to the cellular telephone network.

2. The method recited in claim 1, wherein the transmitted location information is a physical location of the GPS receiver.

3. The method recited in claim 1, wherein the transmitted location information is time-measurement information which indicates the location of the GPS receiver.

4. The method recited in claim 1, further including the step of identifying an incoming call to the cellular telephone network as an emergency call.

5. The method recited in claim 1, wherein the step of assigning a dedicated channel further comprises the step of sending a signal burst in response to a request from the mobile station on another channel.

6. The method recited in claim 1, wherein the step of assigning a dedicated channel further comprises the step of sending an Access Grant CHannel burst in response to a request from the mobile station on a Random Access CHannel.

7. The method recited in claim 1, wherein the step of requesting the GPS receiver to perform a GPS code shift search at a common reference time comprises the step of requesting the GPS receiver to perform the GPS code shift search at a common reference time.

8. The method recited in claim 1, wherein the step of transmitting the auxiliary information to the GPS receiver comprises the step of transmitting the auxiliary information on a Stand alone Dedicated Control CHannel in a Global System for Mobile communication cellular telephone network.

9. The method recited in claim 1, wherein the step of transmitting the auxiliary information to the GPS receiver comprises the step of transmitting the auxiliary information on a Digital Control CHannel in a Digital Advanced Mobile Phone Service cellular telephone network.

10. The method recited in claim 1, wherein the step of transmitting the auxiliary information to the GPS receiver comprises the step of transmitting the auxiliary information on a Short Message Service message.

11. A method for reducing code shift search times of a Global Positioning System Receiver within a mobile station, comprising the steps of:
 requesting from a cellular telephone network auxiliary information for the Global Positioning System receiver within the mobile station, said auxiliary information including a list of satellites in view of the GPS receiver and at least one of Doppler corrections for each satellite, nominal code shift positions, degree of code shift uncertainty for each of the GPS satellites, and elevation angles of the plurality of satellites;
 transmitting the auxiliary information from the cellular telephone network to the GPS receiver within the mobile station;
 performing a GPS code shift search using the provided auxiliary information to determine location information for the mobile station;
 transmitting the location information to the cellular telephone network; and
 wherein the GPS satellites included in the auxiliary information are listed according to their respective elevation angles in descending order.

12. A method for emergency call setup in a cellular telephone network, the method comprising:
 receiving a call request from a mobile station;

determining if the call request is an emergency call request; and performing the following setup procedures if the call request is an emergency call request:

initiating adjustment of a timing advance for the mobile station to synchronize the mobile station with a timing of the network;

assigning a dedicated channel between the mobile station and the network;

estimating a propagation delay between the mobile station and the network based on communications from the mobile station;

providing auxiliary information related to GPS position determination to the mobile station using the assigned dedicated channel;

initiating a GPS code shift search, using the provided auxiliary information, by the mobile station at a common reference time determined based on the estimated propagation delay and the timing of the network to provide location information;

receiving the location information from the mobile station; and then executing normal call setup procedures for the emergency call after receipt of the location information.

13. The method of claim 12 wherein the cellular telephone network is a Global System for Mobile communication (GSM) network and wherein the received call request comprises a request on a Ransom Access Channel (RACH) and wherein assigning a dedicated channel between the mobile station and the network comprises sending an Access Grant Channel (ACCH) burst to assign the dedicated channel and wherein providing auxiliary information related to GPS position determination to the mobile station using the assigned dedicated channel comprises providing the auxiliary information to the mobile station using a Stand alone Dedicated Control Channel (SDCCH).

14. The method of claim 12 wherein the cellular telephone network is a Digital Advanced Mobile Phone Service (DAMPS) network and wherein providing auxiliary information related to GPS position determination to the mobile station using the assigned dedicated channel comprises providing the auxiliary information to the mobile station using a Digital Control Channel (DCCH).

15. The method of claim 12 wherein the location information comprises time-measurement information and wherein the method further comprises converting the time-measurement information into a range measurement to determine a location of the mobile terminal.

16. The method of claim 12 wherein the common reference time is specified as an uplink absolute frame number (AFN).

17. A method for emergency call setup in a cellular telephone network, the method comprising:

determining if a call request input to a mobile station from a user comprises an emergency call; and performing the following setup procedures if the call request input is an emergency call:

transmitting an emergency call request to the network;

adjusting a timing advance for the mobile station to synchronize the mobile station with a timing of the network;

establishing a dedicated channel between the mobile station and the network;

receiving auxiliary information related to GPS position determination at the mobile station using the assigned dedicated channel;

performing a GPS code shift search, using the provided auxiliary information, at the mobile station at a common reference time determined based on information received from the network to provide location information;

transmitting the location information from the mobile station to the network; and then executing normal call setup procedures for the emergency call after receipt of the location information.

\* \* \* \* \*